US008185741B1

(12) United States Patent
Agrawal et al.

(10) Patent No.: US 8,185,741 B1
(45) Date of Patent: May 22, 2012

(54) CONVERTING TRANSPORT LEVEL TRANSACTIONAL SECURITY INTO A PERSISTENT DOCUMENT SIGNATURE

(75) Inventors: Sunil C. Agrawal, Milpitas, CA (US); Jagriti Uppal, Santa Clara, CA (US); Joseph Steele, Danville, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1141 days.

(21) Appl. No.: 11/344,293

(22) Filed: Jan. 30, 2006

(51) Int. Cl.
*H04L 9/32* (2006.01)
(52) U.S. Cl. ....................................................... 713/176
(58) Field of Classification Search .................. 713/150, 713/201; 726/22
See application file for complete search history.

(56) References Cited

U.S. PATENT DOCUMENTS

| | | | | |
|---|---|---|---|---|
| 5,937,162 | A * | 8/1999 | Funk et al. ..................... | 709/206 |
| 6,067,451 | A * | 5/2000 | Campana et al. .......... | 455/412.1 |
| 6,072,942 | A * | 6/2000 | Stockwell et al. ............. | 709/206 |
| 6,324,569 | B1 * | 11/2001 | Ogilvie et al. ................. | 709/206 |
| 6,327,656 | B2 * | 12/2001 | Zabetian ........................ | 713/176 |
| 6,959,382 | B1 * | 10/2005 | Kinnis et al. .................. | 713/170 |
| 7,117,246 | B2 * | 10/2006 | Christenson et al. ......... | 709/206 |
| 7,130,886 | B2 * | 10/2006 | Little et al. .................... | 709/206 |
| 7,493,661 | B2 * | 2/2009 | Liu et al. ........................ | 726/28 |
| 2001/0010685 | A1 * | 8/2001 | Aho ............................... | 370/329 |
| 2002/0019937 | A1 * | 2/2002 | Edstrom et al. ............... | 713/168 |
| 2002/0033961 | A1 * | 3/2002 | Murphy ........................ | 358/1.15 |
| 2003/0182379 | A1 * | 9/2003 | Henry ............................ | 709/206 |
| 2003/0217259 | A1 * | 11/2003 | Wong et al. ................... | 713/153 |
| 2004/0181756 | A1 * | 9/2004 | Berringer et al. ............. | 715/530 |
| 2005/0039019 | A1 | 2/2005 | Delany | |
| 2005/0120242 | A1 * | 6/2005 | Mayer et al. .................. | 713/201 |
| 2006/0048220 | A1 * | 3/2006 | Jahromi et al. ................. | 726/22 |
| 2006/0101271 | A1 * | 5/2006 | Thomas ........................ | 713/180 |
| 2007/0011252 | A1 * | 1/2007 | Taylor ........................... | 709/206 |
| 2007/0083929 | A1 * | 4/2007 | Sprosts et al. .................. | 726/22 |
| 2007/0208931 | A1 * | 9/2007 | Koue et al. .................... | 713/150 |
| 2007/0236749 | A1 * | 10/2007 | Henry et al. .................. | 358/402 |
| 2009/0030997 | A1 * | 1/2009 | Malik ........................... | 709/206 |

OTHER PUBLICATIONS http://en.wikipedia.org/wiki/DomainKeys, pp. 1-3, 2006.
Domain-based Email Authentication Using Public-Keys Advertised in the DNS (DomainKeys), Mark Delany, Yahoo! Inc, Sep. 29, 2005, pp. 1-38.
The TLS Protocol, Version 1.0, T. Dierks and C. Allen, Certicom, Jan. 1999, pp. 1-75.

* cited by examiner

*Primary Examiner* — Nathan Flynn
*Assistant Examiner* — Abdullah Almamun
(74) *Attorney, Agent, or Firm* — Robert C. Kowert; Meyertons, Hood, Kivlin, Kowert & Goetzel, P.C.

(57) ABSTRACT

Briefly, in accordance with one or more embodiments, a transport level transactional security may be converted into a persistent document signature. In one embodiment, a digital signature of an electronic mail message may be saved in a file attached to the electronic mail message. The file with the added digital signature may be saved, transmitted, received, and/or otherwise utilized independent of the original electronic mail message. A receiving node may verify the identity of an originating node based at least in part on the digital signature contained in the file. In alternative embodiment, the signature for the file may be generated at least in part on a message to be transmitted according to a secure transmission and/or file download protocol from a server to a client.

24 Claims, 6 Drawing Sheets

CONVERTING TRANSPORT LEVEL TRANSACTIONAL SECURITY INTO A PERSISTENT DOCUMENT SIGNATURE

BACKGROUND

Electronic mail systems currently in use allow for various file types to be transmitted along with electronic mail messages as an attachment to the electronic mail message. Currently, unsigned files sent via electronic mail or via the Internet have no trust information retained with them. The user has no way of knowing if the document actually came from the company of alleged origin, or whether the contents of the file have been modified in any manner.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, may best be understood by reference to the following detailed description when read with the accompanying drawings in which:

Figure 1:
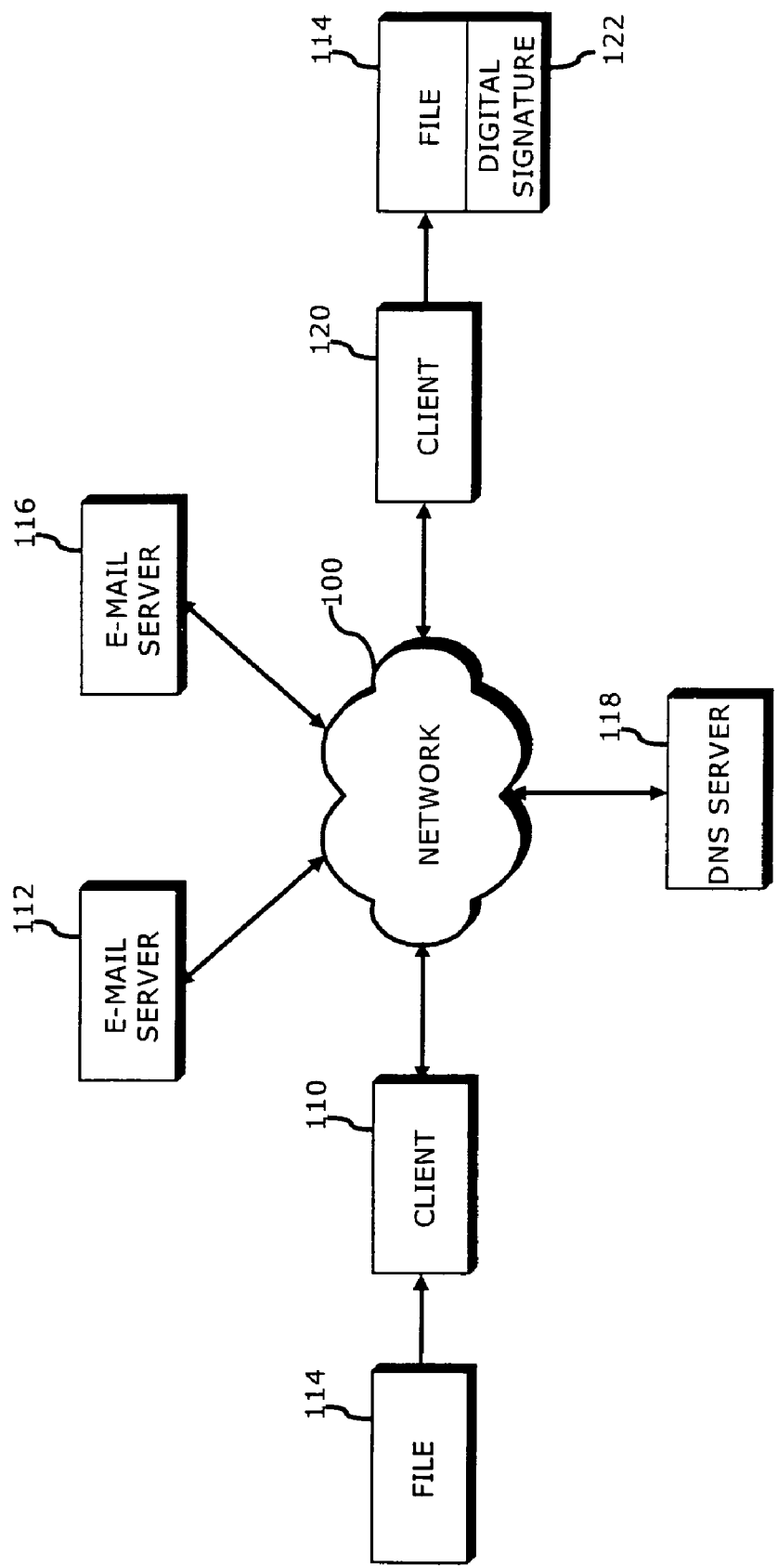
FIG. 1 is a block diagram of an electronic mail network in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

An algorithm and/or process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the following discussions, it is appreciated that throughout the specification discussion utilizing terms such as processing, computing, calculating, determining, and/or the like, refer to the action and/or processes of a computer and/or computing system, and/or similar electronic computing device, that manipulate or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

Referring now to FIG. 1, a block diagram of a network in accordance with one or more embodiments will be discussed. Network 100 may comprise one or more of a local area network (LAN), a wide area network (WAN), a metropolitan area network (MAN), or the like, or combinations thereof. Furthermore, portions of network 100 may comprise wired components and/or links, and wireless components and/or links, or combinations thereof. In one or more embodiments, network 100 may comprise the Internet, although the scope of the claimed subject matter is not limited in this respect. In one or more embodiments, client 110 may comprise a computing platform, information handling system, and/or software to implement an electronic mail (e-mail) program capable of sending and/or receiving e-mail via network 100. In one or more embodiments, such an e-mail program running on client 110 may send e-mail messages in accordance with a Simple Mail Transfer Protocol (SMTP), which may comprise a protocol for sending e-mail messages between servers and/or from an e-mail client to an e-mail server, for example to e-mail server 112 via network 100. In one or more particular embodiments, client 110 may generate an e-mail message that optionally includes file 114 as an attachment to the e-mail message. File 114 may comprise any suitable file format, for example a text file, a document file, an Adobe PostScript® type file or the like, a word processing file, an image file, a sound file, a video file, and/or a multimedia file type or the like. In one or more particular embodiments, file 114 may comprise an Adobe® Portable Document Format (PDF) type file specified by Adobe Systems Incorporated of San Jose, Calif., USA, that is able to be viewed, for example using an Adobe Acrobat® type program, or the like, that is likewise available from Adobe Systems Incorporated. However, these are merely example types for file 114, and the scope of the claimed subject matter is not limited in this respect.

In one or more embodiments, when file 114 is attached to an e-mail message by an e-mail program running on client 110, file 114 may be attached to e-mail message in accordance with a Multipurpose Internet Mail Extensions (MIME) specification or the like, for example as specified by the Internet Engineering Task Force (IETF). Such a MIME type specification may allow for an e-mail program or other MIME compliant type program running on client 110 to send and/or receive various file types, for example as listed above, via mail systems such as an SMTP compliant mail system, although the scope of the claimed subject matter is not limited in this respect. In one or more embodiments, client 110 may send an e-mail message with file 114 as an attachment to the e-mail message via network 100 which may be received and processed by e-mail server 112. In one or more embodiments, e-mail server 116 and/or client 120 receiving the electronic mail message may add a digital signature 122 to file 114 based at least in part on a digital signature already present on the electronic mail message. In one or more alternative embodiments, one or more of client 110 and/or e-mail server 112 may add the digital signature to file 114 based at least in part on a digital signature already present on the electronic mail message. In one or more embodiments, the electronic mail message may be signed with a digital signature that is capable of uniquely identifying the sender of the electronic mail message, for example to allow a recipient of the electronic mail message to verify the identity and/or origin of the electronic mail message, and/or in general to provide authentication of the electronic mail message. In one or more embodiments, the digital signature may be generated and/or utilized in accordance with a public key, private key type mechanism. Such a public key, private key type mechanism may be based at least in part, for example, on a domain name of client 110 and/or e-mail server 112, where one or more domain names may be available for lookup on domain name server (DNS) 118. In one or more embodiments, such a digital signature may be based at least in part and/or compliant with a DomainKeys e-mail authentication system as described in "Domain-based Email Authentication Using Public-Keys Advertised in the DNS (DomainKeys)" published at http://www.ietf.org/internet-drafts/draft-delany-domainkeys-base-03.txt which is hereby incorporated by reference in its entirety. Furthermore, other types of electronic mail verification schemes may be utilized to digitally sign electronic mail messages, for example in accordance with a Secure MIME (SMIME) type protocol, a Sender ID Framework type e-mail authentication technology protocol, and so on. In one particular embodiment, a message digest corresponding to at least a portion of the electronic mail message may be generated, for example using a one-way hash function, to create a digital signature for the electronic mail message. Such a message digest may likewise utilize a public key, private key type mechanism. In general, any transport level technology that is capable of providing authentication and integrity may be utilized. However, these are merely example methods for creating a digital signature for electronic mail messages and/or for otherwise verifying the identity of a sender of an electronic mail message, and the scope of the claimed subject matter is not limited in this respect.

In one or more embodiments, the electronic mail message may be received via network 110 from client 110 to e-mail sever 112, to e-mail server 116 at a receiving end, and/or ultimately to an end user at client 120, wherein file 114 may be received as an attachment to the electronic mail message. In one or more embodiments, the following may be performed by a recipient of the electronic mail message, for example one or more of e-mail server 116 and/or client 120, or combinations thereof. If the electronic mail message is digitally signed, the digital signature information of the electronic mail message may be added at least in part to file 114 itself. In such an arrangement, the transport level security of the electronic mail message may be made into a persistent and/or independently verifiable digital signature by attaching the digital signature information to file 114. In one or more embodiments, file 114 may be obtained from the e-mail message such that file 114, wherein the digital signature information of the electronic mail message may be added to file 114 at any one or more nodes of network 100, for example at client 110, at e-mail server 112, at e-mail server 116, and/or at client 120. Thus, file 114 may be saved independently from the electronic mail message and may include digital signature 122 which may be utilized to verify the origin of file 114. Such verification of the origin of file 114 may be based at least in part on digital signature 122 obtained from file 114, although the scope of the claimed subject matter is not limited in this respect.

Figure 2:
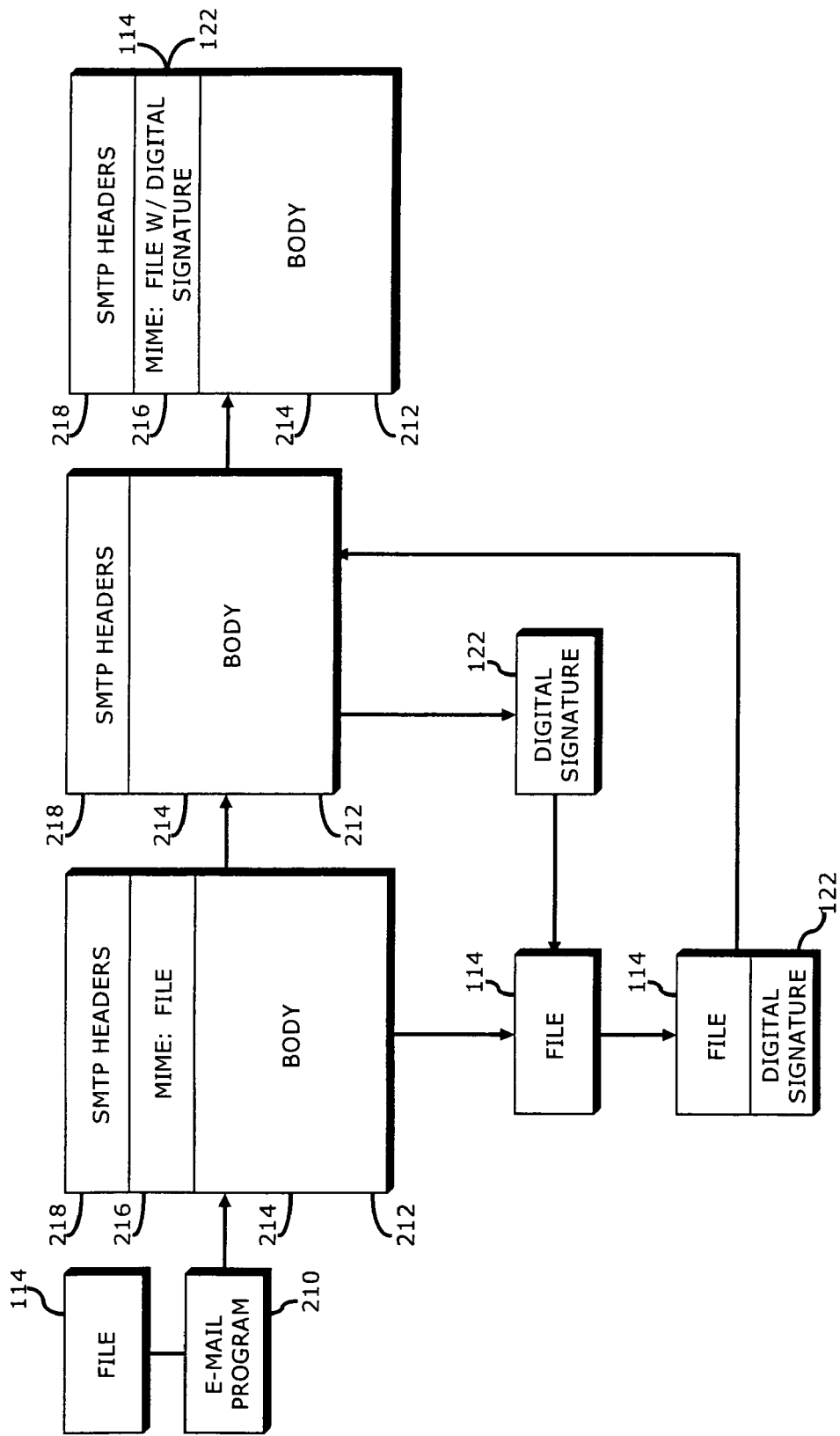
FIG. 2 is a block diagram illustrating the conversion of a transport level transactional security into a file signature as an attachment of an electronic mail message in accordance with one or more embodiments.

Referring now to FIG. 2, a block diagram illustrating the conversion of a transport level transactional security into a file signature in accordance with one or more embodiments will be discussed. As shown in FIG. 2, file 114 may be obtained from e-mail program 210, which for example may be running at a recipient's end, for example on e-mail server 116 and/or client 120. File 114 may be attached as an attachment to e-mail message 212. In one or more embodiments, e-mail message 212 may comprise body 214, file 114 attached to e-mail message 212 for example in MIME type header 216, and/or one or more SMTP type headers 218. In one or more embodiments, client 120 may perform one or more operations that follow, and/or in one or more alternative embodiments, e-mail server 112, e-mail server 116, and/or client 110 may perform one or more operations that follow, and the scope of the claimed subject matter is not limited in this respect. As an example for client 120, e-mail program 210 may save file 114 to a local storage such as a hard disk, and then remove MIME type header 216 from e-mail message 212, leaving body 214 and/or one or more SMTP type headers 218. In one or more embodiments, digital signature 122 may be created and/or obtained based at least in part on e-mail message 212 comprising body 214 and/or one or more SMTP headers 218. In one or more particular embodiments, digital signature 122 may already be present in e-mail message 212, or alternatively digital signature 122 may be created, for example by one or more of client 110, e-mail server 112, e-mail server 116, and/or client 120. In such an embodiment, such creation of digital signature 122 may comprise creating a digital signature via a secure transport level technology to implement an electronic mail authentication system, for example in compliance with a DomainKeys specification, in accordance with a Secure MIME (SMIME) type protocol, a Sender ID Framework type e-mail authentication technology protocol, based at least in part on a message digest, and/or other schemes for generating public keys and/or private keys, and/or MD4 and/or MD5 type algorithms, hashes/checksums, and so on. Digital signature 122 may comprise, for example, a portion of the e-mail message and/or the e-mail message in its entirety less the portion containing file 114 itself, for example a MIME type header 216. Digital signature 122 may then be added to file 114, for example in an incremental section of file 114 without modifying the base contents of file 114. In one or more embodiments, such digital signature 122 may be invisible to the user, and/or the digital signature may be unalterable by the user but otherwise able to be utilized by the user for verification purposes, although the scope of the claimed subject matter is not limited in this respect.

File 114 with digital signature 122 may then be saved, transmitted, received and/or otherwise utilized, which may be independently from the original email message. For authentication purposes, the original e-mail message may be recreated at least in part, or at least digital signature 122 of the e-mail message may be recreated, such that a determination is able to be made regarding the source and/or authenticity of file 114. In one or more embodiments, digital signature 122 may be utilized to determine a domain name and/or address of client 110 and/or e-mail server 112. In one or more embodiments, e-mail program 210 may then utilize file 114 having signature 112 to create MIME type header 216 by attaching file 114 with digital signature 122 as an attachment to e-mail message 212, along with body 214 and/or one or more SMTP type headers 218, although the scope of the claimed subject matter is not limited in this respect.

Figure 3:
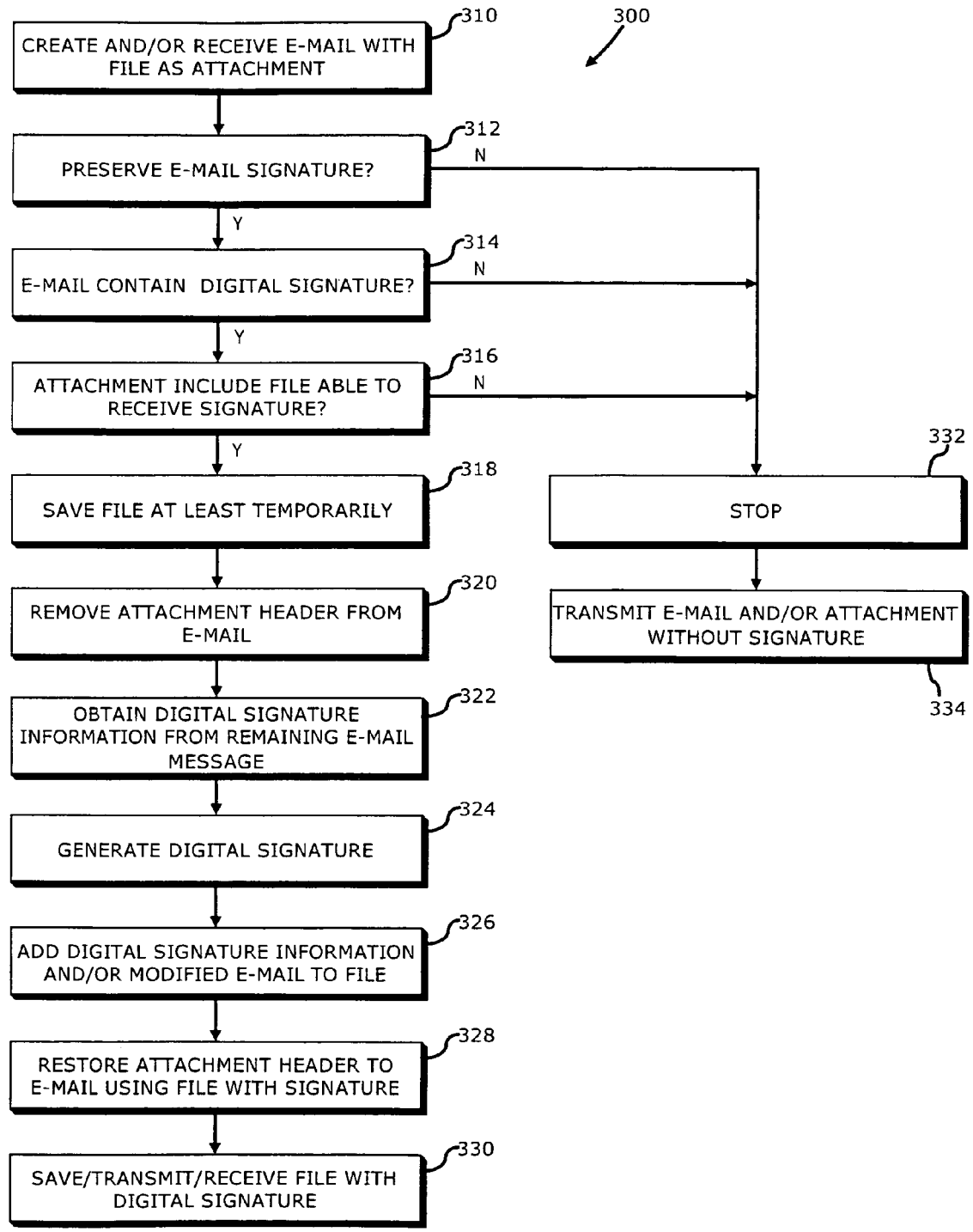
FIG. 3 is a flow diagram of a method for converting a transport level transactional security into a file signature sent as an attachment of an electronic mail message in accordance with one or more embodiments.

Referring now to FIG. 3, a flow diagram of a method for converting a transport level transactional security into a file signature in accordance with one or more embodiments will be discussed. Method 300 shown in FIG. 3 may include more and/or fewer blocks than shown, and furthermore although one particular order of blocks 310 through 334 are shown, other orders may be implemented in method 300, and the scope of the claimed subject matter is not limited in this respect. Furthermore, execution of any of blocks 310 through 334 may be optional in one or more embodiments, and the scope of the claimed subject matter is not limited in this respect. In one or more embodiments, method 300 may be executed by client 120 as shown in FIG. 1, and in one or more alternative embodiments, method 300 may be executed by any one or more of client 110, e-mail server 112, e-mail server 116, and/or client 120, as shown in FIG. 1, individually and/or in combination. In method 300, at block 310 e-mail message 212 as shown in FIG. 2 may be received and/or created with file 114 as an attachment to e-mail message 212, for example in a MIME type header 216 as shown in FIG. 2. At block 312 a determination may be made whether to preserve a digital signature of the e-mail message, which may be determined for example by a user. In the event that it is not desired to preserve the digital signature of the e-mail message, method 300 may stop at block 332. In one or more embodiments, if method 300 stops at block 332, then e-mail message 212 as shown in FIG. 2 may not be sent and/or received, and optionally a message indicating that the e-mail will not be sent and/or received may be returned to a user and/or to an upstream and/or originating node and/or party. In one or more alternative embodiments, if method stops at block 332, then e-mail message 212 as shown in FIG. 2 may still be saved, transmitted, received and/or otherwise utilized without origin and/or signature content at block 334, although the scope of the claimed subject matter is not limited in this respect.

In one or more embodiments, a determination may be made at block 314 whether e-mail message 212 contains a digital signature such as a domain signature. In the event e-mail message 212 does not contain a digital signature or other type of transport level security mechanism, for example a Domain-Keys signature, method 300 may stop at block 332. In the event e-mail message 212 does contain a digital signature, a determination may be made at block 316 whether e-mail message 212 contains an attachment including a file able to receive at least one or more digital signatures of the e-mail message. In one or more embodiments, such a file able to receive at least one or more digital signatures of an e-mail message may comprise file 114 such as a PDF type file or the like. In the event the attachment is not able to receive at least one or more digital signatures, method 300 may stop at block 332. In the event the attachment is able to receive at least one or more digital signatures, file 114 may be saved, at least temporarily, at block 318. The attachment header, such as MIME type header 216, may be removed from e-mail message 212 at block 320, and digital signature 122 may be obtained from the e-mail and/or otherwise created at block 322 based at least in part on a remaining portion of e-mail message 212 having the attachment header containing file 114 removed therefrom. Optionally, digital signature 122 may be created at block 324 in the event the digital signature does not already exist. Such a creation of digital signature 122 may occur for example, at a node from which the electronic mail is generated or otherwise sent, and/or any node on network 100. Digital signature 122 may then be added to file 114 at block 326. For verification purposes and/or for retransmission purposes, the attachment header, such as MIME type header 216, may be restored at block 328 to e-mail message 212 using file 114 with digital signature 122 as the attachment. Further details of verification of digital signature 122 is discussed with respect to FIG. 3. At block 330, file 114 with digital signature 112 may be saved or otherwise transmitted, received, and/or otherwise utilized for example as part of a workflow process, although the scope of the claimed subject matter is not limited in this respect.

Figure 4:
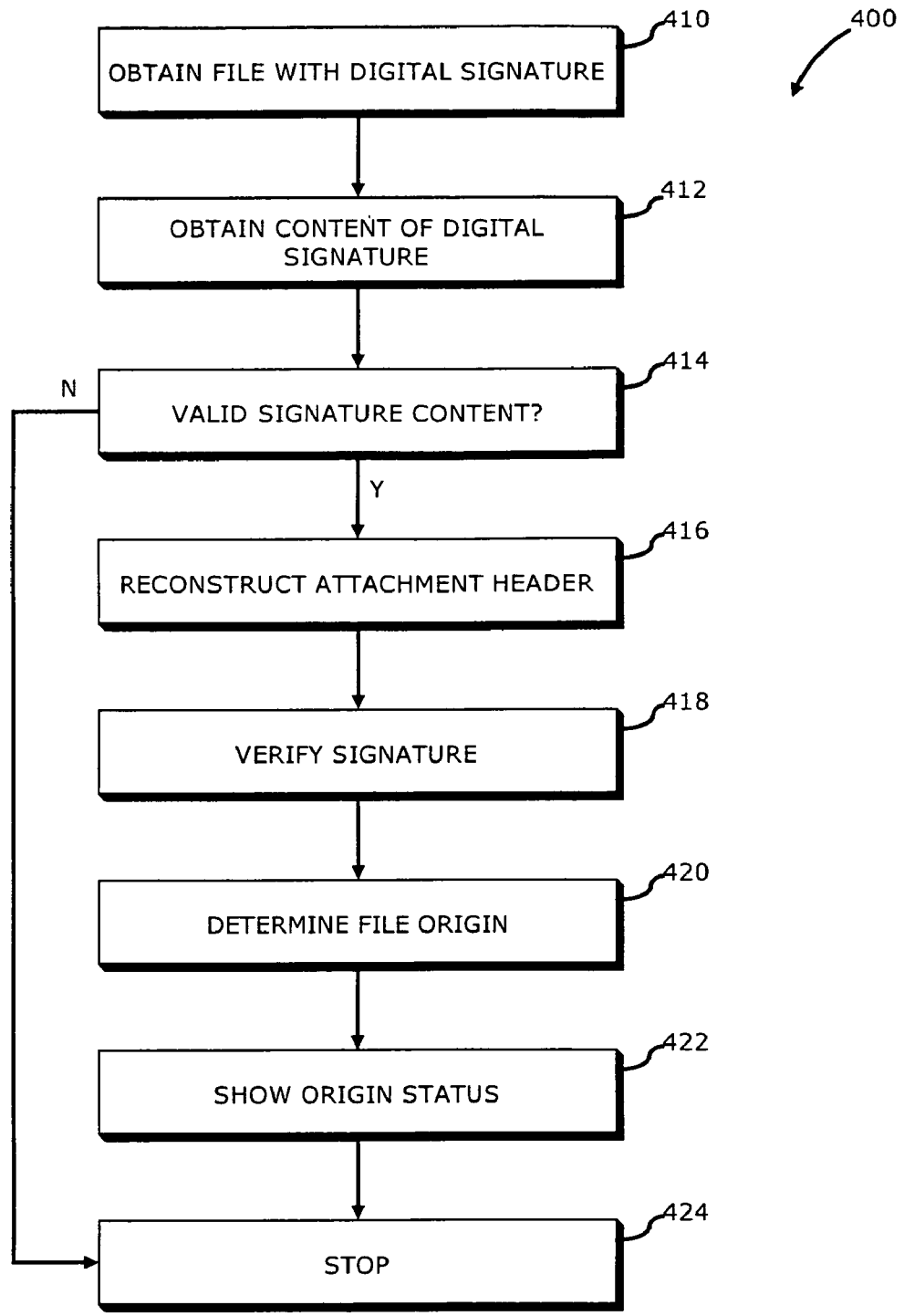
FIG. 4 is a flow diagram of a method for verifying a signature in a file sent as an attachment to an electronic mail message in accordance with one or more embodiments.

Referring now to FIG. 4, a flow diagram of a method for verifying a digital signature in a file sent as an attachment to an e-mail message in accordance with one or more embodiments will be discussed. Method 400 shown in FIG. 4 may include more and/or fewer blocks than shown, and furthermore although one particular order of blocks 410 through 424 are shown, other orders may be implemented in method 400, and the scope of the claimed subject matter is not limited in this respect. Furthermore, execution of any of blocks 410 through 424 may be optional in one or more embodiments, and the scope of the claimed subject matter is not limited in this respect. In one or more embodiments, method 400 may be executed by client 120, and in one or more alternative embodiments method 400 may be executed by any one or more of client 110, e-mail server 112, e-mail server 116, and/or client 120, individually or in combination. In method 400, at block 410 file 114 with digital signature 122 may be obtained, for example by client 120. The content of digital signature 122 of file 114 may be obtained from file 114 at block 412, for example from an incremental section of file 114 containing digital signature 122. A determination may be made at block 414 whether file 114 contains valid signature content. For example, if the incremental section of file 114 from which digital signature 122 is obtained contains other data in addition to digital signature 122, this may be an indication that digital signature 122 may not be a valid signature. If digital signature 122 is determined not to be a valid signature, digital signature 122 may be marked as an invalid signature and method 400 may stop at block 424.

In one or more embodiments, if digital signature 122 is determined to be a valid signature, the attachment header, such as MIME type header 216, may be reconstructed at block 416. For example, if the data in header 216 was encoded, for example using Base64, file 114 may be Base64 encoded before being part of e-mail message 212. At block 418, digital signature 122 may be verified, for example in accordance with a DomainKeys type specification, and/or the contents of digital signature 122 may be obtained and authenticated, although the scope of the claimed subject matter is not limited in this respect. At block 420, the origin of file 114 may be determined, for example as originating with client 110 and/or e-mail server 112, and the origin status may be shown at block 422, for example by displaying the origin of file to a user. In one or more embodiments, when the origin status of file 114 is shown at block 422, digital signature 122 may be displayed on and/or concurrently with the display of file 114, and may optionally show, for example, a domain name and/or address of client 110 and/or e-mail server 112, and/or may display an e-mail address of the sender of file 114, although the scope of the claimed subject matter is not limited in this respect.

Figure 5:
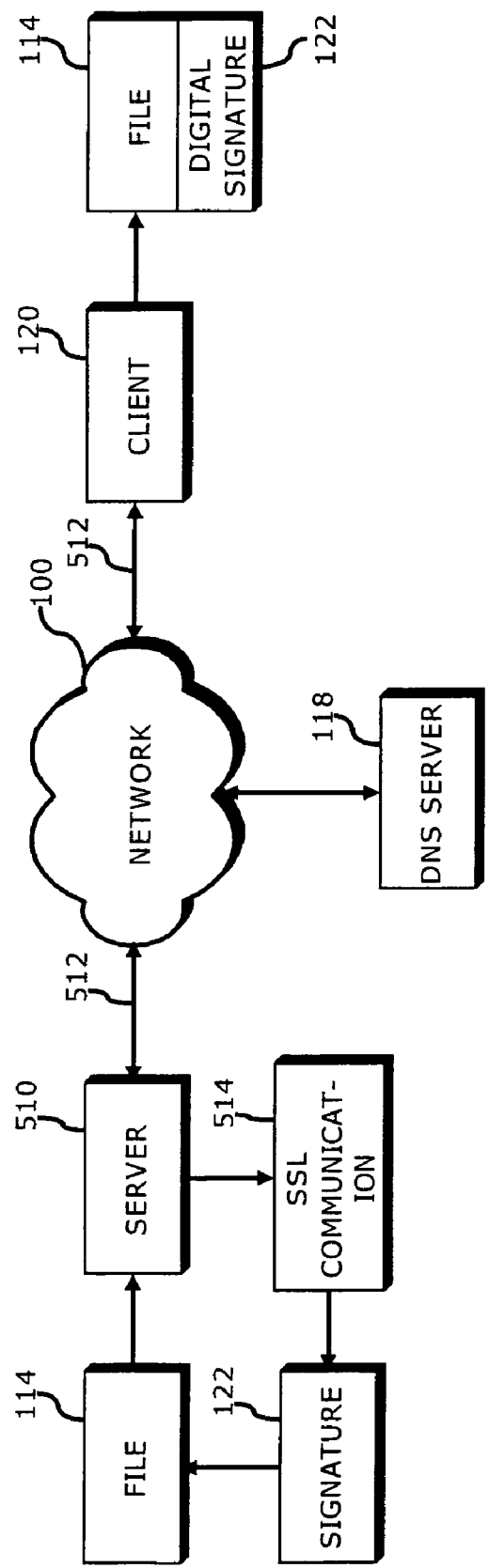
FIG. 5 is a block diagram of a client server network in accordance with one or more embodiments.

Referring now to FIG. 5, a block diagram of a client server network in accordance with one or more embodiments will be discussed. Network 100 as shown in FIG. 5 may be substantially similar to network 100 as shown in FIG. 1 except where receipt, delivery, and/or other utilization of file 114 with digital signature 122 may occur as in a client server type arrangement as shown in FIG. 5 in contrast to the electronic mail delivery of file 114 having digital signature 122 as shown in FIG. 1. In one or more embodiments, network 100 of FIG. 5 may be substantially similar to network 100 of FIG. 1, and in one or more embodiments network 100 of FIG. 4 may be the same network as network 100 of FIG. 1, although the claimed subject matter is not limited in this respect. Other components and/or nodes of FIG. 5 may be substantially the same as and/or identical to components and/or nodes of FIG. 1, although the claimed subject matter is not limited in this respect. As shown in FIG. 5, client 120 may request server 510 to provide file 114 to client 120 via network 100. In such an arrangement, server 510 may couple with client 120 via network in accordance with a Secure Sockets Layer (SSL) type protocol or the like in which documents such as file 114 may be transmitted from server 510 to client 120 where network 100 may comprise, for example, the Internet. Such an SSL type protocol or the like may encrypt transmissions between client 120 and server 510, for example using two keys, a public key that may be generally available and knowable to everyone and a private key that is known, at least in a limited arrangement, only to the recipient of the encrypted message, for example where such a recipient may be client 120. In one or more embodiments, a digital signature for file 114 may be based at least in part and/or compliant with an encryption system as described in "The TLS Protocol Version 1.0" as published at http://www.ietf.org/rfc/rfc2246.txt in the Request for Comments (RFC) document rfc2246.n However, these are merely example methods for creating a digital signature for file 114, and other types of secure protocols and/or digital signature schemes may be employed, for example Secure Hyper Text Transfer Protocol (S-HTTP), and the scope of the claimed subject matter is not limited in this respect.

In one or more embodiments, client 120 may request server 510 to provide file 114 to client 120 for downloading of file 114 to client 120 via network 100 via an SSL type protocol. In such an arrangement, an SSL type connection 512 may be established between client 120 and server 510 in which SSL type packets may be transmitted between client 120 and sever 510. Such SSL type packets may be saved and utilized at least in part to generate digital signature 122 for file 114. Such creation of digital signature 122 for file 114 may be performed, for example, by server 510 and/or by client 120, and/or by any node on network 100, or combinations thereof. Before such SSL type packets are saved into file 114, one or more higher level SSL type protocol messages may be modified. For example, when a GET type command is transmitted from client 120 to server 510, server 510 may fetch file 114 and generate a response SSL type communication 514 containing file 114. In one or more embodiments, file 114 may be removed from SSL type communication 514, for example in a manner substantially similar to the removal of MIME type header 216 from e-mail message 212 as shown in FIG. 2. In one or more embodiments, such higher level protocol message and/or messages may be removed, leaving the SSL type envelope in tact, although the scope of the claimed subject matter is not limited in this respect. Such modified SSL envelope may be saved in file 114 as digital signature 122, for example by a receiver's SSL server and/or by client 120.

In one or more embodiments, client 120 may verify the origin and/or authenticity of file 114 based at least in part on digital signature 122 contained in file 114. Once file 114 is obtained from such an SSL type communication 514, client 120 may use SSL communication 514 to determine whether file 114 is a valid file received from server 510. The obtained version of file 114 may be reinjected into one or more higher level SSL type protocol messages of communication 514. In one or more embodiments, any encoding originally applied to the message by server 510 may be applied to file 114 before such reinjection. Next, SSL type communication 514 may be replayed by client 120 as if client 120 were receiving communication 514 from server 510, except that such communication 514 may be performed from a memory of client 120 rather than via network 100. In the event such a replay of communication 514 is successful without error, the signature may be considered to be valid. Thus, validation of file 114 may be performed by client 120 by replicating the receipt of SSL type communication 514. In such an arrangement, SSL type protocol may provide for integrity of the exchange of communication 514 and/or may also provide server authentication, and provide such as part of digital signature 122 of file 114, for example where file 114 may comprise a PDF type file or the like, although the scope of the claimed subject matter is not limited in this respect.

Figure 6:
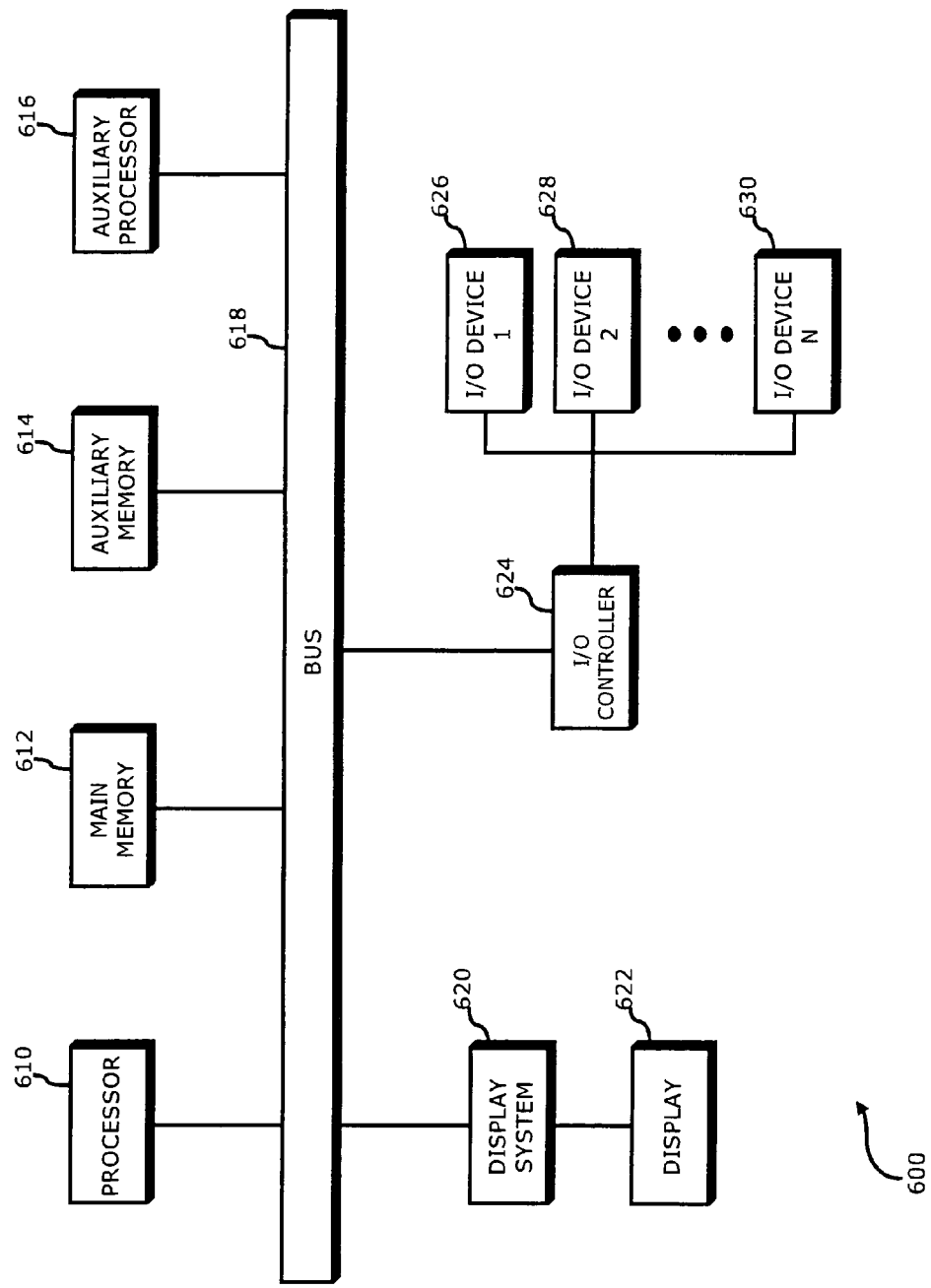
FIG. 6 is a block diagram of an information handling system in accordance with one or more embodiments.

Referring now to FIG. 6, a block diagram of an information handling system capable of converting transport level transactional security into a persistent document signature in accordance with one or more embodiments will be discussed. Information handling system 600 may be utilized to tangibly embody any one or more of client 110, client 120, e-mail server 112, e-mail sever 116, DSN server 118 as shown in FIG. 1, and/or server 510, and/or other nodes and/or devices comprising network 100 as shown in FIG. 5, by providing hardware components on which computer programs 100 such as e-mail program 210 may be executed, for example to execute method 300 of FIG. 3, and/or method 400 of FIG. 4, or the like. Such a computer program and/or machine readable instructions may be tangibly stored on a computer and/or machine readable medium such as a compact disk (CD), digital versatile disk (DVD), flash memory device, hard disk drive (HDD), and so on. As shown in FIG. 6, information handling system 600 may be controlled by processor 610. Processor 610 may comprise a central processing unit such as a microprocessor or microcontroller for executing programs, performing data manipulations and controlling the tasks of information handling system 600. Communication with processor 610 may be implemented via bus 618 for transferring information among the components of information handling system 600. Bus 618 may include a data channel for facilitating information transfer between storage and other peripheral components of information handling system 618. Bus 618 further may provide a set of signals utilized for communication with processor 610, including, for example, a data bus, and address bus, and/or a control bus. Bus 618 may comprise any bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on, although the scope of the claimed subject matter is not limited in this respect.

Other components of information handling system may include, for example, main memory 612, and/or auxiliary memory 614. Information handling system 600 may further comprise auxiliary processing processor 616, which may be another processor, a digital signal processor, and so on. Main memory 612 may provide storage of instructions and data for programs to be executed by processor 610. Main memory 612 may be, for example, semiconductor-based memory such as dynamic random access memory (DRAM) and/or static random access memory (SRAM), and/or the like. Other semiconductor-based memory types may include, for example, synchronous dynamic random access memory (SDRAM), Rambus dynamic random access memory (RDRAM), ferroelectric random access memory (FRAM), and so on. Auxiliary memory 612 may be utilized to store instructions and/or data that to be loaded into main memory 612 before execution. Auxiliary memory 614 may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memory 614 may also include any type of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well. Information handling system 600 optionally include auxiliary processor 616 which may be an auxiliary processor to manage input/output, an auxiliary processor to perform floating point mathematical operations, a digital signal processor and/or any special-purpose microprocessor having an architecture suitable for fast execution of signal processing algorithms, a back-end processor and/or any slave type processor subordinate to processor 610, an additional microprocessor and/or controller for dual and/or multiple processor systems, and/or a coprocessor and/or additional processor. Such auxiliary processors may be discrete processors and/or or may be arranged in the same package as processor 610, for example in a multicore and/or multithreaded processor, however the scope of the claimed subject matter is not limited in these respects.

Information handling system 600 further may include display system 620 for connecting to display 622, and further may include input/output (I/O) controller 624 to connect to one or more I/O devices including, for example, I/O device 626, I/O device 628, up to an Nth I/O device, I/O device 630. Display system 620 may comprise a video display adapter having components for driving display 622, including, for example, video memory, a buffer, and/or a graphics engine. Such video memory may be, for example, video random access memory (VRAM), synchronous graphics random access memory (SGRAM), windows random access memory (WRAM), and/or the like. Display 622 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma a type display, an electroluminescent type display, a vacuum fluorescent type display, a cathodoluminescent and/or field emission type display, a plasma addressed liquid crystal (PALC) type display, a high gain emissive display (HGED) type display, and so forth. Input/output controller 624 may comprise one or more controllers and/or adapters to prove interface functions between one or more of I/O device 626, I/O device 628, and/or I/O device 630. For example, input/output controller 624 may comprise a serial port, parallel port, universal serial bus (USB) port, and IEEE 1394 serial bus port, infrared port, network adapter, printer adapter, radio-frequency (RF) communications adapter, universal asynchronous receiver-transmitter (UART) port, and/or the like, to interface between corresponding I/O devices such as a keyboard, mouse, trackball, touchpad, joystick, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electro-acoustic transducer, microphone, speaker, audio amplifier, and/or the like. Input/output controller 624 and/or I/O device 626, I/O device 628, and/or I/O device 630 may provide and/or receive analog and/or digital signals to communicate between information handling system and external devices, networks, and/or information sources. Input/output controller 624 and/or I/O device 626, I/O device 628, and/or I/O device 630 may implement industry promulgated architecture standards, including, for example, Ethernet IEEE 802 type standards, such as IEEE 802.3 for broadband and/or baseband networks, IEEE 802.3z for Gigabit Ethernet, IEEE 802.4 for token passing bus networks, IEEE 802.5 for token ring networks, IEEE 802.6 for metropolitan area networks and/or the like, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. Information handling system 600 of FIG. 6 is merely one example of an information handling system and/or computing platform, and the scope of the claimed subject matter is not limited in this respect.

Although the claimed subject matter has been described with a certain degree of particularity, it should be recognized that elements thereof may be altered by persons skilled in the art without departing from the spirit and/or scope of the claimed subject matter. It is believed that converting transport level transactional security into a persistent document signature and/or many of its attendant advantages will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    performing by one or more computers:
        receiving an electronic mail message from a remote computer, wherein the electronic mail message comprises a message body, a digital signature, and a file; wherein the digital signature certifies an origin of the electronic mail message, wherein the digital signature is generated based on the message body and not based on the file;

wherein said file does not include said digital signature when the electronic mail message is received;

generating a modified representation of the received file that is distinct from the received electronic mail message, wherein the modified representation of the file includes a modified portion created subsequent to the receipt of the electronic mail message, wherein said modified portion includes said digital signature; and subsequent to said receiving and the generation of the modified representation of the file, evaluating the digital signature of said modified portion of the modified representation of the file to determine an origin of the modified representation of the file as being the origin of the electronic mail message certified by said digital signature.

2. A method as claimed in claim 1, wherein generating the modified representation of the file comprises:

removing a header from the electronic mail message corresponding to the attachment of the file to the electronic mail message.

3. A method as claimed in claim 1, wherein the digital signature indicates one or more of an internet protocol address, a domain name, or an electronic mail address, each of which correspond to the identity of an originating node of the electronic mail message, and wherein the originating node comprises one or more of a client, an internet service provider, or an electronic mail server.

4. A method as claimed in claim 1, further comprising:

removing contents of the file from the electronic mail message corresponding to the attachment of the file to the electronic mail message to provide a modified electronic mail message; wherein said modified portion is generated such that the modified representation of the file comprises said modified electronic mail message.

5. A method as claimed in claim 1, wherein the method comprises verifying the digital signature specified by said modified portion to determine the origin of the modified representation of the file as being the origin of the electronic mail message.

6. A method as claimed in claim 1, wherein evaluating said modified portion comprises:

generating a second representation of the received electronic mail message based at least in part on said modified portion and evaluating the second representation of the received electronic mail message.

7. A method, comprising:

performing by one or more computers:

establishing a secure communication link with a remote client computer for communicating a file to the client computer, wherein said establishing comprises exchanging information with the client computer over an electronic network according to a security protocol;

creating a digital signature for said file such that the digital signature includes at least some of the information exchanged with the client computer to establish the secure communication link according to the security protocol, wherein the digital signature certifies the origin of the file;

combining the digital signature with the file such that the digital signature is a part of the file; and transmitting the file including said digital signature to the client computer via said secure communication link such that the digital signature certifies the origin of the transmitted file on the client computer after the secure communication link is broken.

8. A method as claimed in claim 7, wherein said security protocol includes one or more of Secure Socket Layer protocol or Secure Hypertext Transport Protocol.

9. A method, comprising:

using one or more computer to perform:

establishing a secure communication link with a particular server computer, wherein said establishing comprises exchanging information with the client computer over an electronic network according to a security protocol;

receiving a file over said secure communication link from the particular server computer;

storing a digital signature within said file, the digital signature including at least some of the information exchanged with the particular server computer to establish the secure communication link, wherein the digital signature certifies the file was provided by the particular server computer; and after the secure communication link is broken, evaluating the digital signature including said information exchanged with the particular server computer to establish the secure communication link in order to determine that the file was provided by the particular server computer.

10. A method as claimed in claim 9, wherein said evaluating the digital signature comprises:

after the secure communication link is broken, performing a simulation of that secure communication link, said simulation including accessing the file from a local memory according to said security protocol and according to security information extracted from the digital signature previously stored within said file, wherein that security information comprises said at least some of the information exchanged with the particular server computer to establish the secure communication link;

determining that the file was provided by the particular server computer in response to determining that no errors resulted from performing the simulation of the secure communication link.

11. A method as claimed in claim 9, wherein said security protocol includes one or more of: Secure Socket Layer protocol or Secure Hypertext Transport Protocol.

12. An article of manufacture having instructions stored thereon that, in response to being executed by a processor, direct said processor to:

receive an electronic mail message from a remote computer, wherein the electronic mail message comprises a message body, a digital signature and a file; wherein the digital signature certifies an origin of the electronic mail message, wherein the digital signature is generated based on the message body and not based on the file; wherein said file does not include said digital signature when the electronic mail message is received;

generate a modified representation of the file that is distinct from the received electronic mail message, wherein the modified representation of the file includes a modified portion created subsequent to the receipt of the electronic mail message, wherein said modified portion includes said digital signature; and subsequent to said receiving and the generation of the modified representation of the received file, evaluate the digital signature of said modified portion of the modified representation of the file to determine an origin of the modified representation of the file as being the origin of the electronic mail message certified by said digital signature.

13. An article of manufacture as claimed in claim 12, wherein to generate the modified representation of the file, the instructions, in response to being executed by said processor, further direct said processor to:
remove a header from the electronic mail message corresponding to the attachment of the file to the electronic mail message.

14. An article of manufacture as claimed in claim 12, wherein the digital signature indicates one or more of an internet protocol address, a domain name, or an electronic mail address each of which correspond to the identity of an originating node of the electronic mail message, and wherein the originating node comprises one or more of a client, an internet service provider, or an electronic mail server.

15. An article of manufacture as claimed in claim 12, wherein the instructions, in response to being executed by said processor, further direct said processor to:
remove contents of the file from the electronic mail message corresponding to the attachment of the file to the electronic mail message to provide a modified electronic mail message; wherein said modified portion is generated such that the modified representation of the file comprises said modified electronic mail message.

16. An article of manufacture as claimed in claim 12, wherein the instructions, in response to being executed by said processor, further direct said processor to verify the digital signature specified by said modified portion to determine the origin of the modified representation of the file as being the origin of the electronic mail message.

17. An article of manufacture as claimed in claim 12, wherein to evaluate said modified portion, the instructions, in response to being executed by said processor, further direct said processor to:
generate a second representation of the received electronic mail message based at least in part on said modified portion and evaluating the second representation of the received electronic mail message.

18. An article of manufacture having instructions stored thereon that, in response to being executed by a processor, direct said processor to:
establish a secure communication link with a remote client computer for communicating a file to the client computer, wherein establishing the secure communication link comprises exchanging information with the client computer over an electronic network according to a security protocol;
create a digital signature for said file such that the digital signature includes at least some of the information exchanged with the client computer to establish the secure communication link according to the security protocol, wherein the digital signature certifies the origin of the file;
combine the digital signature with the file such that the digital signature is a part of the file; and
transmit the file including said digital signature to the client computer via said secure communication link such that the digital signature certifies the origin of the transmitted file on the client computer after the secure communication link is broken.

19. An article of manufacture as claimed in claim 18, wherein said security protocol includes one or more of Secure Socket Layer protocol or Secure Hypertext Transport Protocol.

20. An article of manufacture having instructions stored thereon that, in response to being executed by said processor, further direct said processor to:
establish a secure communication link with a particular server computer, wherein establishing the secure communication link comprises exchanging information with the client computer over an electronic network according to a security protocol;
receive a file over said secure communication link from the particular server computer;
store a digital signature within said file, the digital signature including at least some of the information exchanged with the particular server computer to establish the secure communication link, wherein the digital signature certifies the file was provided by the particular server computer; and
after the secure communication link is broken, evaluate the digital signature including said information exchanged with the particular server computer to establish the secure communication link in order to determine that the file was provided by the particular server computer.

21. An article of manufacture as claimed in claim 20, wherein to evaluate the digital signature the instructions, in response to being executed by said processor, further direct said processor to:
after the secure communication link is broken, perform a simulation of that secure communication link, said simulation including accessing the file from a local memory according to said security protocol and according to security information extracted from the digital signature previously stored within said file, wherein that security information comprises said at least some of the information exchanged with the particular server computer to establish the secure communication link;
determine that the file was provided by the particular server computer in response to determining that no errors resulted from performing the simulation of the secure communication link.

22. An article of manufacture as claimed in claim 20, wherein said security protocol comprises one or more of Secure Socket Layer protocol or Secure Hypertext Transport Protocol.

23. An apparatus, comprising:
means for receiving an electronic mail message from a remote computer, wherein the electronic mail message comprises a message body, a digital signature, and a file; wherein the digital signature certifies an origin of the electronic mail message, wherein the digital signature is generated based on the message body and not based on the file; wherein said file does not include said digital signature when the electronic mail message is received;
means for generating a modified representation of the file that is distinct from the received electronic mail message, wherein the modified representation of the file includes a modified portion created subsequent to the receipt of the electronic mail message, wherein said modified portion includes said digital signature; and
means for subsequent to said receiving and the generation of the modified representation of the received file, evaluating the digital signature of said modified portion of the modified representation of the file to determine an origin of the modified representation of the file as being the origin of the electronic mail message certified by said digital signature.

24. An apparatus, comprising:
means for establishing a secure communication link with a particular server computer, wherein said establishing comprises exchanging information with the client computer over an electronic network according to a security protocol;

means for receiving a file over said secure communication link from the particular server computer;

means for storing a digital signature within said file, the digital signature including at least some of the information exchanged with the particular server computer to establish the secure communication link, wherein the digital signature certifies the file was provided by the particular server computer; and means for, after the secure communication link is broken, evaluating the digital signature including said information exchanged with the particular server computer to establish the secure communication link in order to determine that the file was provided by the particular server computer.

* * * * *